United States Patent
Sim et al.

(10) Patent No.: US 8,638,957 B2
(45) Date of Patent: Jan. 28, 2014

(54) SOUND REPRODUCTION APPARATUS AND A METHOD FOR SPEAKER CHARGING/CALIBRATION EMPLOYED IN SAID APPARATUS

(75) Inventors: Wong Hoo Sim, Singapore (SG); Boon Keat Eddy Toh, Singapore (SG); Jeng Khim Tan, Singapore (SA); Susimin Suprapmo, Singapore (SG)

(73) Assignee: Creative Technology Ltd, Singapore (SG)

( * ) Notice: Subject to any disclaimer, the term of this patent is extended or adjusted under 35 U.S.C. 154(b) by 1 day.

(21) Appl. No.: 13/384,264

(22) PCT Filed: Jul. 21, 2010

(86) PCT No.: PCT/SG2010/000277
§ 371 (c)(1),
(2), (4) Date: Jan. 16, 2012

(87) PCT Pub. No.: WO2011/010968
PCT Pub. Date: Jan. 27, 2011

(65) Prior Publication Data
US 2012/0121111 A1      May 17, 2012

(30) Foreign Application Priority Data
Jul. 24, 2009 (SG) ............................... 200904990-9

(51) Int. Cl.
*H04R 25/00* (2006.01)
*H04R 5/02* (2006.01)

(52) U.S. Cl.
USPC ......................................................... 381/182

(58) Field of Classification Search
USPC ..................................................... 381/181, 182
See application file for complete search history.

(56) References Cited

U.S. PATENT DOCUMENTS

| | | | |
|---|---|---|---|
| 6,487,296 B1 * | 11/2002 | Allen et al. ..................... | 381/80 |
| 6,608,907 B1 * | 8/2003 | Lee .............................. | 381/311 |
| 8,126,182 B2 * | 2/2012 | Chang ........................... | 381/334 |
| 2008/0247554 A1 * | 10/2008 | Caffrey .......................... | 381/18 |

OTHER PUBLICATIONS

PCT/SG2010/000277 International Preliminary Report on Patentability and Written Opinion.

* cited by examiner

*Primary Examiner* — Brian Ensey
*Assistant Examiner* — Norman Yu
(74) *Attorney, Agent, or Firm* — Creative Technology Ltd

(57) ABSTRACT

There is provided a sound reproduction apparatus including a sub-woofer unit and a plurality of wireless speakers. A method of speaker charging and speaker calibration using the sound reproduction apparatus is also provided. The sub-woofer unit may be configured to perform tasks of both charging a power source in each of the plurality of wireless speakers; and calibrating speaker identity for each of the plurality of wireless speakers. It is advantageous that both of the tasks are performed when the plurality of wireless speakers is coupled to the sub-woofer unit. The speaker identity may include, for example, left front, right front, left rear, right rear, and center.

11 Claims, 3 Drawing Sheets

SOUND REPRODUCTION APPARATUS AND A METHOD FOR SPEAKER CHARGING/CALIBRATION EMPLOYED IN SAID APPARATUS

FIELD OF INVENTION

This invention relates to a sound reproduction apparatus, particularly in a form of wireless speakers, and how the sound reproduction apparatus enables wireless operability and calibration of each of the speakers.

BACKGROUND

It is becoming increasingly common for people to set up cinema-style sound reproduction systems in homes and even workplaces as there is an increasing appreciation that playback quality of both audio and visual aspects of recorded movies in storage media such as, for example, VCDs, DVDs and the like affects an experience when consuming recorded content such as, for example, a movie, a filmlet and so forth. A significant proportion of the content currently available is provided with multi-channel audio tracks, and these multi-channel audio tracks can only be properly reproduced with the use of cinema-style sound reproduction systems.

These cinema-style sound reproduction systems typically enable generation of "surround sound" when reproducing the multi-channel audio tracks. While complexity and composition of such cinema-style sound reproduction systems may vary in accordance with a specification of the systems, these systems typically comprise at least one sub-woofer and a plurality of speakers. The plurality of speakers would usually be positioned both in front of and behind an area which would be occupied by at least one person during consumption of the recorded content.

It is evident that in an instance when the plurality of speakers are of a wired type, the greater the number of speakers, the greater the number of cables which need to be organized. It is typically a hassle to conceal the cables and non-concealment of the cables would usually be detrimental to an aesthetic appeal of an area where the cinema-style sound reproduction system is deployed. In this regard, an increasing number of cinema-style sound reproduction systems now utilize wireless speakers.

Unfortunately, the wireless speakers typically require either regular renewal of dry cell batteries or repeated recharging of built-in power sources. The recharging of the built-in power sources is typically carried out by either a direct connection of the built-in power source to a power supply or by coupling the wireless speaker to a speaker recharging dock. This is inconvenient.

Furthermore, the wireless speakers need to be re-positioned in the locations where they were originally located so as to adhere to calibration parameters of the cinema-style sound reproduction system. This is troublesome if there is confusion in relation to an identity of each wireless speaker when each of the wireless speakers share an identical appearance. The reproduction of the multi-channel audio tracks is adversely affected if the wireless speakers are misplaced from their pre-defined position.

The present invention aims to solve the aforementioned issues to ensure a more desirable wireless cinema-style sound reproduction system.

SUMMARY

In a first aspect, there is provided a sound reproduction apparatus including a sub-woofer unit and a plurality of wireless speakers. The sub-woofer unit may be configured to perform tasks of both charging a power source in each of the plurality of wireless speakers; and calibrating speaker identity for each of the plurality of wireless speakers. It is advantageous that both of the tasks are performed when the plurality of wireless speakers is coupled to the sub-woofer unit. The speaker identity may include, for example, left front, right front, left rear, right rear, and centre.

The sub-woofer unit may be either independently powered or powered by an external source. The plurality of wireless speakers may be coupled to the sub-woofer unit by a wired connection, with the wired connection being a power line connection. The power source in each of the plurality of wireless speakers may be charged via either the wired connection or induction charging.

Each of the plurality of wireless speakers may be located in a receptor defining a shape of a base of each of the plurality of wireless speakers on a surface of the sub-woofer unit when each of the plurality of wireless speakers is coupled to the sub-woofer unit. The speaker identity may depend on which receptor each of the plurality of wireless speakers is located in. Preferably, each receptor may include an activator to reset the identity of the coupled wireless speaker, the activator being triggered when the wireless speaker is located in the receptor.

Alternatively, each of the plurality of wireless speakers is located in a region defining a shape of a base of each of the plurality of wireless speakers on a surface of the sub-woofer unit when each of the plurality of wireless speakers is coupled to the sub-woofer unit. The speaker identity may depend on which region each of the plurality of wireless speakers is located in. Each region may include an activator to reset the identity of the coupled wireless speaker, the activator being triggered when the wireless speaker is located in the region.

In a second aspect, there is provided a method for charging and calibrating speaker identity for a plurality of wireless speakers of a sound reproduction apparatus including a sub-woofer unit with a plurality of either receptors or regions. The method includes placing each of the plurality of wireless speakers onto a surface of the sub-woofer unit to couple each of the plurality of wireless speakers to the sub-woofer unit; charging each of the plurality of wireless speakers via either a wired connection or induction charging; and calibrating speaker identity for each of the plurality of wireless speakers in accordance to either receptor or region each of the plurality of wireless speakers is located in.

The sub-woofer unit may be either independently powered or powered by an external source. Each of the plurality of receptors may define a shape of a base of each of the plurality of wireless speakers on the surface of the sub-woofer unit. Alternatively, each of the plurality of regions may define a shape of a base of each of the plurality of wireless speakers on the surface of the sub-woofer unit. The wired connection may be a power line connection.

Preferably, either each receptor or each region includes an identity activator to reset the identity of the coupled wireless speaker, the identity activator being triggered when the wireless speaker is located in either the receptor or the region.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
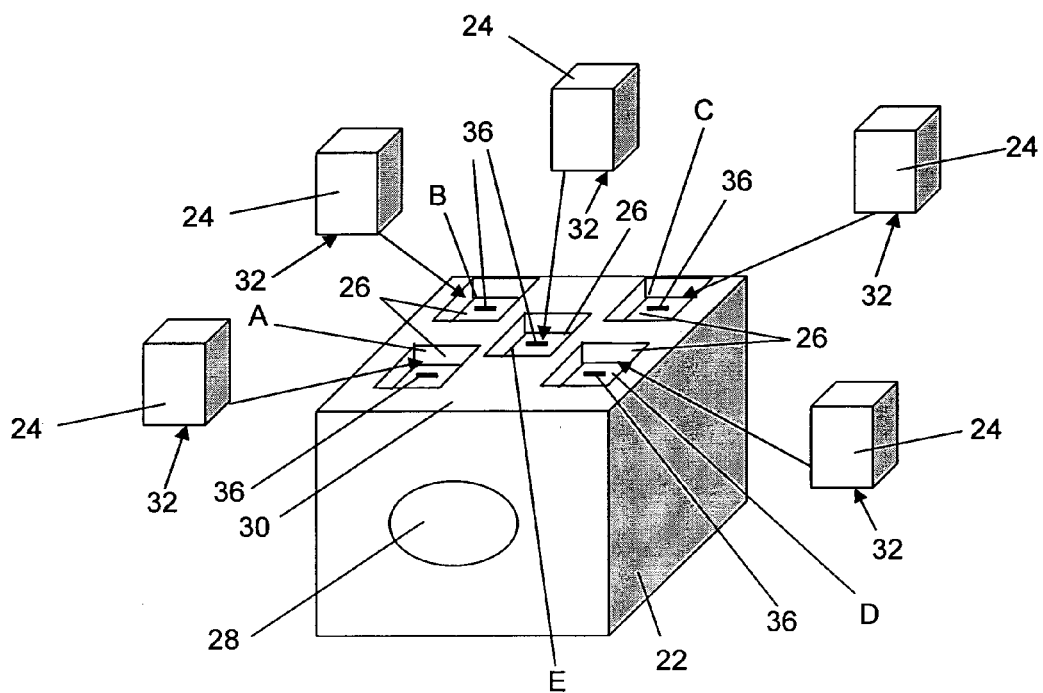
FIG. 1 shows a perspective illustration of a sound reproduction apparatus of the present invention.

With reference to FIG. 1, there is provided a sound reproduction apparatus 20. The sound reproduction apparatus 20 may be in a form of a cinema-style sound reproduction system with multiple speakers 24 and a bass-generating sub-woofer unit 22, which is able to reproduce multi-channel audio tracks (surround sound) whenever a content source includes a soundtrack with multi-channel audio tracks. The sound reproduction apparatus 20 shown in FIG. 1 is a 5.1 system, but this representation for the number of multiple speakers 24 is not meant to be limiting in any way.

Figure 4:
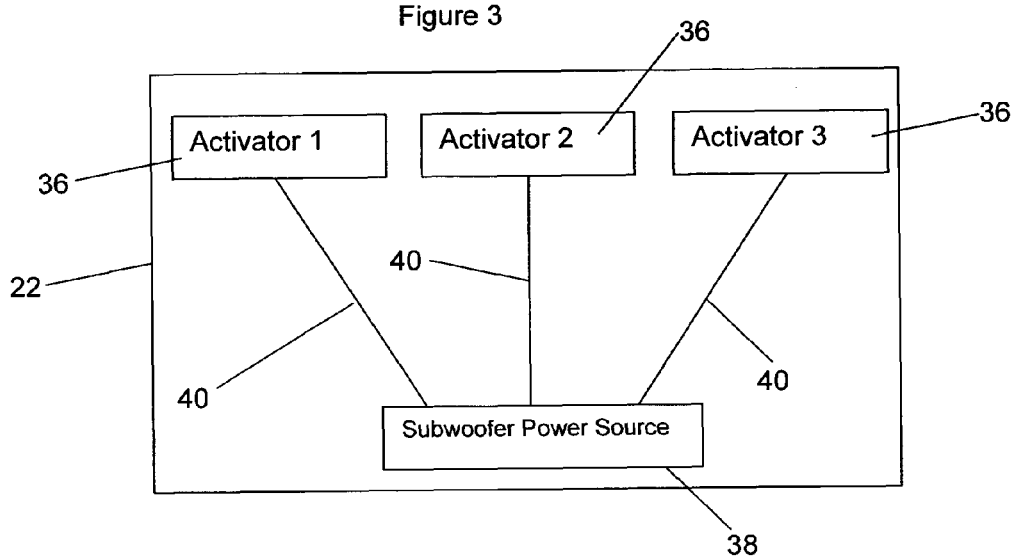
FIG. 4 shows a schematic diagram of a sub-woofer unit of the sound reproduction apparatus of the present invention.

The sound reproduction apparatus 20 includes a sub-woofer unit 22 and a plurality of wireless speakers 24. While the plurality of wireless speakers 24 shown in FIG. 1 are of an identical shape and form, it should be appreciated that this need not always be so. In addition, the sub-woofer unit 22 may either be shaped in a block-like manner as shown in FIG. 1 or any form which would allow the generation of bass from the sub-woofer unit 22. While a single port tube 28 is shown in the sub-woofer unit 22, there may be more than one port tube 28 in the sub-woofer unit 22. Referring to FIG. 4, the sub-woofer unit 22 may be either independently powered by an on-board battery 38 (as shown) or powered via an external connection to an external source.

The sub-woofer unit 22 may include a plurality of receptors 26. The plurality of receptors 26 may each define a shape of a base 32 of each of the plurality of wireless speakers 24. It should be appreciated that the base 32 relates to a face of each wireless speaker 24 which contacts the sub-woofer unit 22. The plurality of receptors 26 may be located at a surface 30 of the sub-woofer unit 22. It should be appreciated that while the surface 30 is shown to be a top surface of the sub-woofer unit 22 in an orientation as shown in FIG. 1, the plurality of receptors 26 need not always be located at the top surface of the sub-woofer unit 22. Each of the plurality of receptors 26 allows placement of a wireless speaker 24, and placement of the wireless speaker 24 into each receptor 26 enables a coupling of the wireless speaker 24 and the sub-woofer unit 22. It should be appreciated that while the plurality of receptors 26 is shown in FIG. 1 to be a plurality of depressions at the surface 30 of the sub-woofer unit 22, the plurality of receptors 26 may also refer to regions at the surface 30 defined by markings (printed, etched or otherwise) where each of the plurality of wireless speakers 24 is able to couple to the sub-woofer unit when each of the plurality of wireless speakers 24 is placed/positioned/located at the regions. It should be appreciated that the markings may define the shape of the base 32 of each of the plurality of wireless speakers 24.

The sub-woofer unit 22 may be configured to perform tasks of both charging a power source in each of the plurality of wireless speakers 24, and calibrating speaker identity for each of the plurality of wireless speakers 24. Speaker identity refers to an audio channel reproduced by the wireless speaker 24, such as, for example, left front, right front, left rear, right rear, centre and so forth. The aforementioned tasks are performed when the plurality of wireless speakers 24 is coupled to the sub-woofer unit 22.

Figure 2:
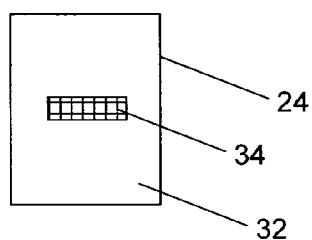
FIG. 2 shows a base view of one of a plurality of speakers of the sound reproduction apparatus of the present invention.
Figure 3:
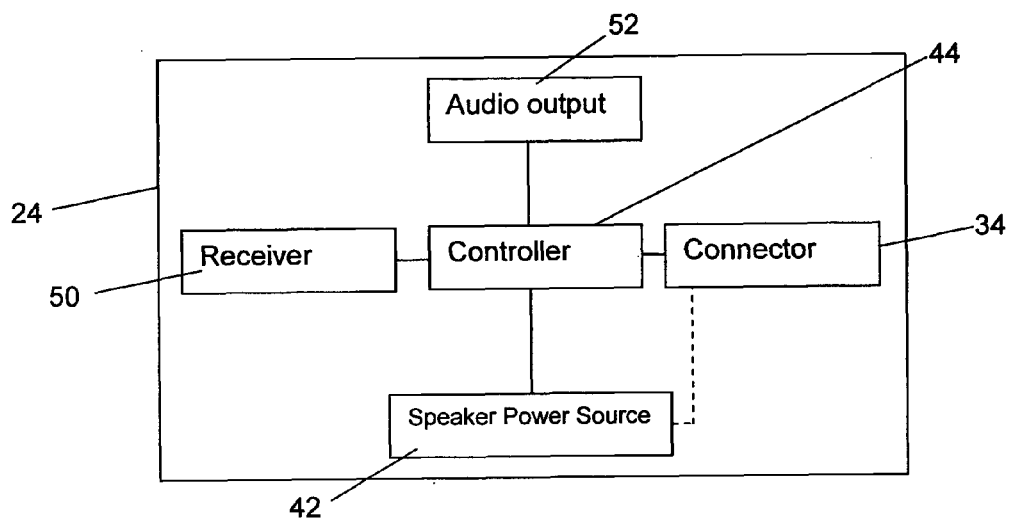
FIG. 3 shows a schematic diagram of one of a plurality of speakers of the sound reproduction apparatus of the present invention.

Referring to FIG. 2, there is shown, for the sake of illustration, the base 32 of one of the plurality of wireless speakers 24. The base 32 includes a connector 34, which is able to be coupled to an activator 36 in each of the receptors 26. The coupling of the activator 36 with the connector 34 enables the wireless speaker 24 to be coupled to the sub-woofer unit 22 by a wired connection. The wired connection may include a power line connection. Referring to FIG. 4, there is shown a schematic view of the sub-woofer unit 22. Power line connections 40 are shown from a sub-woofer power source 38 to each of the activators 36. It should be appreciated that when the connector 34 of the wireless speaker 24 is coupled to the activator 36 of the sub-woofer unit 22, a speaker power source 42 (as shown in FIG. 3) is charged through a direct connection from the sub-woofer power source 38 to the speaker power source 42. Referring to FIGS. 3 and 4, the direct connection is from the sub-woofer power source 38, to the activator 36, to the connector 34 of the wireless speaker 24, to a controller 44 of the wireless speaker 24 and finally to the speaker power source 42. It may also be possible for the connector 34 of the wireless speaker 24 to be directly coupled to the speaker power source 42.

In an alternative embodiment, the activator 36 of the sub-woofer unit 22 may not have power line connections 40 for connection to the sub-woofer power source 38. In this alternative embodiment, the speaker power source 42 may be charged using induction charging methods. It should be appreciated that induction charging of the speaker power source 42 is enabled by placing the wireless speaker 24 at either the receptors 26 or the regions defined by markings which ensure that the speaker power source 42 is located in close proximity to at least one induction coil in the sub-woofer unit 22 to enable induction charging of the speaker power source 42.

The receptors 26 of the sub-woofer unit 22 may be arranged in a manner which denotes a relative location where respective wireless speakers 24 are supposed to be positioned when the sound reproduction apparatus 20 is set up to reproduce the multi-channel audio tracks. With reference to FIG. 1, the plurality of the receptors 26 are each denoted by labels A, B, C, D and E. A non-limiting arrangement manner would be, for example, for the wireless speaker 24 located in receptor 26 (A) to emit sound as a left front speaker, for the wireless speaker 24 located in receptor 26 (B) to emit sound as a left rear speaker, for the wireless speaker 24 located in receptor 26 (D) to emit sound as a right front speaker, for the wireless speaker 24 located in receptor 26 (C) to emit sound as a right rear speaker, and for the wireless speaker 24 located in receptor 26 (E) to emit sound as a centre speaker (in front of a user). Thus, the speaker identity of the wireless speakers 24 is directly affected by the receptor 26 which the wireless speaker 24 is placed in.

Referring to FIGS. 3 and 4, each receptor 26 includes the activator 36 to also enable the speaker identity of the wireless speaker 24 to be reset when placed in either the receptor 26 or the region defined by markings. Each of the regions at the surface 30 defined by markings may also include the activator 36. When the wireless speaker 24 is placed in the receptor 26 or the region defined by markings, the activator 36 couples to the connector 34 of the wireless speaker 24. The activator 36 may either send pre-defined data to the controller 44 of the wireless speaker 24 or physically trigger signals (for example, by using data pins) to the controller 44 of the wireless speaker 24. The controller 44 then recognizes either the data or the signals. The speaker identity is then calibrated and stored in the controller 44. A receiver 50 of the wireless speaker 24 is for receiving an appropriate audio channel in accordance with the speaker identity while an audio output 52 is for reproducing audio signals from the appropriate audio channel in accordance with the speaker identity.

Figure 5:
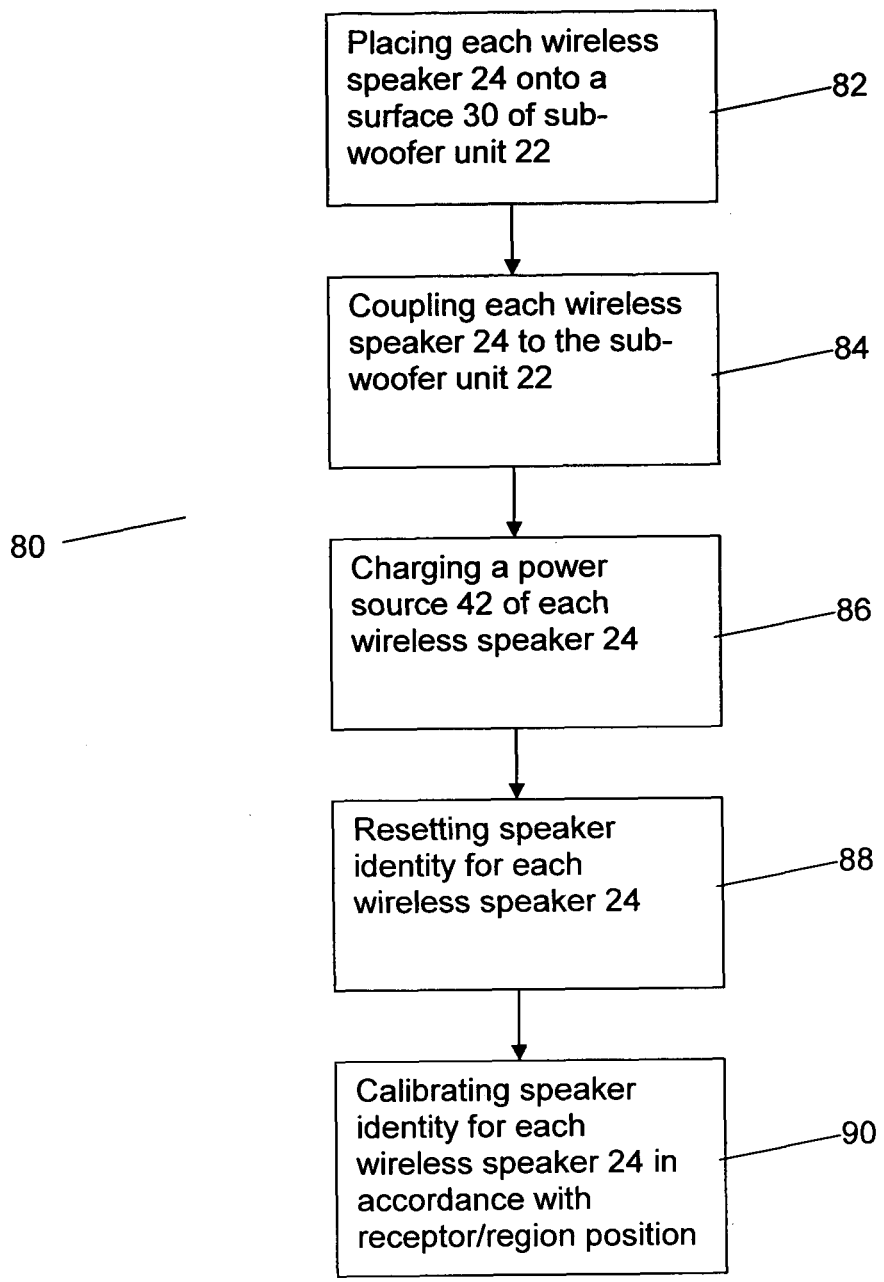
FIG. 5 shows a process flow for a method of the present invention.

Referring to FIG. 5, there is shown another aspect of the present invention, a process flow for a method 80 for charging and calibrating speaker identity for a plurality of wireless speakers of a sound reproduction apparatus. The sound reproduction apparatus may be in a form of a cinema-style sound reproduction system with multiple speakers and a bass-generating sub-woofer, which is able to reproduce multi-channel audio tracks (surround sound) whenever a content source includes a soundtrack with multi-channel audio tracks. Reference is also made to FIGS. 1-4 for the subsequent portions for the sake of clarity while describing the method 80. The sound reproduction apparatus 20 shown in FIG. 1 is a 5.1 system, but this representation is not meant to be limiting in any way.

A sub-woofer unit 22 may either be shaped in a block-like manner or any form which would allow the generation of bass from the sub-woofer unit 22. There may be more than one port tube 28 in the sub-woofer unit 22. The sub-woofer unit 22 may be either independently powered by an on-board battery 38 or powered via an external connection to an external source.

The sub-woofer unit 22 may include a plurality of receptors 26. The plurality of receptors 26 may each define a shape of a base 32 of each of the plurality of wireless speakers 24. It should be appreciated that the base 32 relates to a face of each wireless speaker 24 which contacts the sub-woofer unit 22. The plurality of receptors 26 may be located at a surface 30 of the sub-woofer unit 22. The surface 30 is not necessarily a top surface of the sub-woofer unit 22. Each of the plurality of receptors 26 allows placement of a wireless speaker 24. It should be appreciated that while the plurality of receptors 26 may be a plurality of depressions at the surface 30 of the sub-woofer unit 22, the plurality of receptors 26 may also refer to regions at the surface 30 defined by markings (printed, etched or otherwise) where each of the plurality of wireless speakers 24 is able to couple to the sub-woofer unit 22 when each of the plurality of wireless speakers 24 is placed at the regions. It should be appreciated that the markings may define the shape of a base of each of the plurality of wireless speakers 24.

The method 80 includes placement of the wireless speaker 24 onto the surface 30 of the sub-woofer unit 22 (82), either into each receptor 26 or at regions defined by markings. Placing the wireless speaker 24 onto the surface 30 of the sub-woofer unit 22 enables a coupling of the wireless speaker 24 and the sub-woofer unit 22 (84).

The wireless speakers 24 may include a connector 34, which is able to be coupled to an activator 36 in each receptor 26 or an activator 36 at the regions defined by markings. The coupling of the activator 36 with the connector 34 enables the wireless speaker 24 to be coupled to the sub-woofer unit 22 by a wired connection 40. There may be power line connections 40 from the sub-woofer power source 38 to the activators 36.

Thus, it should be appreciated that when the connector 34 of the wireless speaker 24 is coupled to the activator 36 of the sub-woofer unit 22, a speaker power source 42 is charged through a direct connection from the sub-woofer power source 38 to the speaker power source 42 (86). The direct connection may be from the sub-woofer power source 38, to the activator 36, to the connector 34 of the wireless speaker 24, to a controller 44 of the wireless speaker 24 and finally to the speaker power source 42. It may also be possible for the connector 34 of the wireless speaker 24 to be directly coupled to the speaker power source 42.

In an alternative embodiment, the activator 36 of the sub-woofer unit 22 may not have power line connections 40 for connection to the sub-woofer power source 38. Instead, the speaker power source 42 may be charged using induction charging methods. It should be appreciated that induction charging of the speaker power source 42 is enabled by placing the wireless speaker 24 at either the receptors 26 or the regions defined by markings which ensure that the speaker power source 42 is located in close proximity to at least one induction coil in the sub-woofer unit 22 to enable induction charging of the speaker power source 42.

Each receptor 26 or region defined by markings includes the activator 36 to enable the speaker identity of the wireless speaker 24 to be reset when placed in the receptor 26 or the region defined by markings (88). When the wireless speaker 24 is placed in the receptor 26 or the region defined by markings, the activator 36 couples to the connector 34 of the wireless speaker 24. The activator 36 may either send pre-defined data to the controller 44 of the wireless speaker 24 or physically trigger signals (for example, by using data pins) to the controller 44 of the wireless speaker 24. The controller 44 then recognizes either the pre-defined data or the signals. The speaker identity is then calibrated and stored in the controller 44 (90). The receptors 26 of the sub-woofer unit 22 may be arranged in a manner which denotes a relative location where respective wireless speakers 24 are supposed to be positioned when the sound reproduction apparatus 20 is set up to reproduce multi-channel audio tracks.

The plurality of the receptors 26 are each denoted by labels A, B, C, D and E. A non-limiting arrangement manner would be, for example, for the wireless speaker 24 located in receptor 26 (A) to emit sound as a left front speaker, for the wireless speaker 24 located in receptor 26 (B) to emit sound as a left rear speaker, for the wireless speaker 24 located in receptor 26 (D) to emit sound as a right front speaker, for the wireless speaker 24 located in receptor 26 (C) to emit sound as a right rear speaker, and for the wireless speaker 24 located in receptor 26 (E) to emit sound as a centre speaker (in front of a user). Thus, the speaker identity of the wireless speakers 24 is directly affected by the receptor 26 which the wireless speaker 24 is placed in.

It should be appreciated that a sequence which is used to described the method 80 in the preceding paragraphs is not restricted in relation to the sequence. The described sequence for the method 80 is merely illustrative. For example, the resetting of speaker identity for each wireless speaker 24 (88) need not follow the charging of a power source 42 for each wireless speaker 24 (86). The resetting of speaker identity for each wireless speaker 24 (88) may take place either prior to or simultaneously with the charging of a power source 42 for each wireless speaker 24 (86).

Whilst there has been described in the foregoing description preferred embodiments of the present invention, it will be understood by those skilled in the technology concerned that many variations or modifications in details of design or construction may be made without departing from the present invention.

The invention claimed is:

1. A sound reproduction apparatus including a sub-woofer unit and
a plurality of wireless speakers, the sub-woofer unit being configured to perform tasks of both: charging a power source in each of the plurality of wireless speakers; and calibrating speaker identity for each of the plurality of wireless speakers, the speaker identity being referenced to an audio channel reproduced by the wireless speaker, wherein the sub-woofer unit includes a plurality of receptors arranged in a manner which denotes a relative location where respective wireless speakers are supposed to be positioned when the sound reproduction apparatus is set up, wherein the speaker identity for a wireless speaker is calibrated based on the receptor it is placed therein, and wherein both of the tasks are performed when the plurality of wireless speakers is coupled to the sub-woofer unit.

2. The sound reproduction apparatus of claim 1, wherein the sub-woofer unit is either independently powered or powered by an external source.

3. The sound reproduction apparatus of claim 1, wherein the plurality of wireless speakers is coupled to the sub-woofer unit by a wired connection.

4. The sound reproduction apparatus of claim 3, wherein the wired connection is a power line connection.

5. The sound reproduction apparatus of claim 3, wherein the power source in each of the plurality of wireless speakers is charged via either the wired connection or induction charging.

6. The sound reproduction apparatus of claim 1, wherein each of the plurality of wireless speakers is located in a receptor defining a shape of a base of each of the plurality of wireless speakers on a surface of the sub-woofer unit when each of the plurality of wireless speakers is coupled to the sub-woofer unit.

7. The sound reproduction apparatus of claim 1, the audio channel reproduced by the wireless speaker being one of left front, right front, left rear, right rear and centre.

8. The sound reproduction apparatus of claim 1, wherein each receptor includes an activator to reset the identity of the coupled wireless speaker, the activator being triggered when the wireless speaker is located in the receptor, and wherein the activator is further configurable to one of send predefined data and trigger signals in a manner so as to calibrate the speaker identity of the wireless speaker.

9. The sound reproduction apparatus of claim 1, wherein each of the plurality of wireless speakers is located in a region defining a shape of a base of each of the plurality of wireless speakers on a surface of the sub-woofer unit when each of the plurality of wireless speakers is coupled to the sub-woofer unit.

10. The sound reproduction apparatus of claim 9, wherein the speaker identity depends on which region each of the plurality of wireless speakers is located in.

11. The sound reproduction apparatus of claim 10, wherein each region includes an activator to reset the identity of the coupled wireless speaker, the activator being triggered when the wireless speaker is located in the region.

* * * * *